3,529,669
PROCESS FOR CLEANING POROUS MEDIA
Warren E. Tietz, Englewood, Colo., assignor to Marathon Oil Company, Findlay, Ohio, a corporation of Ohio
No Drawing. Filed Jan. 6, 1969, Ser. No. 789,356
Int. Cl. E21b 43/25, 43/27
U.S. Cl. 166—307                                     12 Claims

ABSTRACT OF THE DISCLOSURE

The permeability of porous media which have become plugged by polymer solutions is restored by washing the porous media, in sequence, with: sodium hypochlorite solution; brine or water to remove the sodium hypochlorite solution; brine or water to remove the sodium hypochlorite solution; a lower aliphatic alcohol or ketone; an oil-soluble solvent; a lower aliphatic alcohol or ketone; and then with brine or water.

CROSS-REFERENCE TO RELATED APPLICATION

U.S. pat application Ser. No. 789,355 filed Jan. 6, 1969 and assigned to the assignee of the present invention relates to the general field of the present invention and broadly teaches stimulation of wells using sodium hypochlorite and similar compounds.

BACKGROUND OF THE INVENTION

This invention relates to a method of stimulating oil wells, e.g. by improving the flow characteristics of reservoir rock which has been plugged with a polymer solution in the civinity of the well bore. More specifically, this invention relates to a method of restoring the permeability of a porous media plugged with polymer solution by washing the media utilizing a series of sequential treatments.

Formation damage or skin damage in the area surrounding the well bore may be caused by the invasion of foreign fluids and/or solids in this area. Oftentimes, these foreign particles are introduced as components of the drilling mud. The resulting formation is often subjected to clay swelling, emulsification, or precipitation of solids, e.g. ferric hydroxide, causing size reduction or plugging of internal pores by intruding solids, etc. Various methods have been employed to reduce or eliminate this formation damage and increase the permeability of the formation adjacent the well bore so that further hydrocarbon may be recovered from the formation. Three well known methods are nitroshooting, hydraulic fracturing, and acidizing.

The increased use recently of polymer solution in drilling muds and secondary waterflooding operations, as well as tertiary flooding operations, has presented a need for a method which will effectively reduce plugging in the vicinity of the well bore. These applications of the polymer solutions cause deposits of the polymer in the sand rock, thus reducing the relative permeability to the flow of water.

A related problem involves the reclaiming of consolidated sand cores which have been used in the laboratory to test various applications of polymer treatment. Heretofore, there has been no reliable and inexpensive method for cleaning core samples which have been polymer flooded. Generally, after a polymer flooding operation, there remains residual oil and polymer plugging which must be removed before the core sample can be reclaimed for reruns or other tests. It has generally been necessary to discard these once-used cores for lack of an effective method to remove this residual oil and restore the original permeability. Not only is a core expensive to replace, but the procedures of preparing the core, e.g. heating the new core, replacing the old core (including taking it out of its casing), "potting" the new core, machining the new core to fit the casing, etc., increase the cost of laboratory testing. Thus, a relatively inexpensive method for reclaiming cores would be highly beneficial and an improvement over the old practice of discarding the cores in favor of using new ones.

SUMMARY OF THE INVENTION

Applicants have found that the permeability of porous media plugged with polymer can be substantially increased by injecting an aqueous solution having a pH of at least about 8 and containing a compound or mixture of compounds of the formula MOX wherein M is an alkali metal or ammonium and X is a halogen, e.g. sodium hypochlorite. Furthermore, the porous media can be cleaned of any remaining substances, e.g. polymer and oil, from a flooding type operation by injecting, in sequence: brine or water to remove the sodium hypochlorite solution; a lower aliphatic alcohol or ketone; an oil-soluble halohydrocarbon solvent to remove hydrocarbon and alcohol; a lower aliphatic alcohol or ketone; and then brine or water to remove the lower aliphatic alcohol.

DESCRIPTION OF THE PREFERRED EMBODIMENTS

By a porous media which is "plugged" is meant a porous media whose permeability to the flow of fluids has been reduced as a result of the invasion of foreign materials (e.g. high molecular weight polymers) which reduce the effective permeability of the media. It is postulated, e.g. that polyacrylamides and like materials are adsorbed onto the porous media—the result being to reduce the effect cross-sectional area of the pores within the media.

Polymers which may cause plugging of the formation around a well bore generally have a molecular weight above about 5,000 and generally above about 500,000 and up to and including 10 million or more. An example of a polymer which is readily cleaved by the solution of this invention is a partially hydrolyzed, high molecular weight polyacrylamide, marketed under the Pusher trade name by Dow Chemical Company. Aqueous solutions of these polymers have utility as viscosity enhancing and mobility control agents useful in displacing fluids in secondary and tertiary recovery of oil. Polymers are also useful components in drilling muds. They are especially advantageous as mobility control agents in an aqueous medium to displace miscible-type flooding fluids such as microemulsions, transparent emulsions, soluble oils, etc. In most processes of this nature, the polyacrylamide solution is followed by a conventional water drive. Because of the nature of the polymer involved, many of the polymer molecules are trapped, e.g. adsorbed, in the pore openings of the formation surrounding the well bore resulting in reduced permeabilities, i.e. water injection rates must be increased to maintain the same injectivity index. For any constant injection rate, these polymer deposits will cause a large pressure drop to occur by the time the water enters the formation, thus limiting the rate at which water can be injected and the overall rate of recovering hydrocarbon.

It is necessary that the character of the aqueous solution to be injected for increasing the permeability be of basic characteristic, preferably having a pH greater than 8, more preferably greater than about 9, and most preferably having a pH greater than about 10.5. As the pH of the solution decreases below about 8, its ability to cleave the polymer radically diminishes. The aqueous solution contains a compound of the formula MOX where M is an alkali metal or ammonium and X is a halogen. Preferred alkali metals include lithium, potassium, and most preferred, sodium. The halogens may be selected from fluorine, chlorine, bromine, or iodine, although if fluorine is utilized, care should be taken to use dilute solutions to prevent explosive fracturing of the formation. The most preferred halogen is chlorine. Examples of preferred permeability increasing compounds are potassium hypochlorite, sodium hypochlorite, potassium hypobromite, sodium hypobromite, ammonium hypochlorite, ammonium hypobromite, lithium hypobromite, lithium hypochlorite, and similar compounds. The compounds are added to water to form a solution which has a pH greater than 8, and preferably greater than 10.5. In general, there will preferably be from 0.25% to about 10% and more preferably from about 1% to about 4% and most preferably from about 2% to about 4% by weight of the permeability increasing compound in the solution to be injected. The most preferred solution is made up of 3% by weight of sodium hypochlorite in distilled water. It is preferred to inject from about 0.1 to about 50 barrels of the solution per vertical foot of oil-bearing sand to be treated, and more preferably from about 1 to about 10 barrels per foot, although greater or lesser amounts may be injected depending on the nature of the formation or porous media. Commercially available solutions containing sodium hypochlorite and inert ingredients may be used advantageously.

Where large amounts of connate water are present in the vicinity of the well bore, more concentrated solutions of permeability increasing solution are desired to insure that the resultant in situ solution has the required minimum pH of 8.

The aqueous formulation may contain various compatible additives if desired. Thus, it can be useful to add one or more of the following additives: corrosion inhibitors, anti-emulsifying agents, sequestering agents, bactericides, and other additives or mixtures of additives, depending upon the conditions of the particular well and adjacent oil-bearing formation. It can also be quite useful to follow the injection of the basic permeability increasing solution with other standard well stimulation techniques. Therefore, it is often useful to acidize the well after polymer plugging has been reduced, e.g. to break up calcareous deposits. The acidic solution preferably contains from 0.1 to 35 and more preferably 1 to 20% by weight of a strong acid, preferably a mineral acid, e.g. sulfuric acid, hydrochloric acid. By a strong acid is meant one which has an ionization constant K greater than preferably about $10^{-2}$. (See for instance "How Acids Behave in Solution," H. K. van Poollen, Oil and Gas Journal, Sept. 25, 1967, p. 100.) Weak acid, e.g. acetic, formic, having K values in the range of $10^{-5}$ to $10^{-2}$ are also useful, as well as in admixture with mineral acids. Hydrocracking and other techniques may also be employed, depending on the well conditions and objectives of the well stimulation needed.

Although the mechanism of the permeability increase in accordance with this invention is not entirely understood, it is thought that the basic solution cleaves the polymers, reducing their molecular weight and viscosity, and therefore unplugging the pores of the formation, allowing freedom of flow. As the pH of the solution is increased above 8, the solution becomes more effective as a polymer viscosity reducing agent.

After the sodium hypochlorite-type permeability increasing solution has been injected, brine, water, or brackish water (in certain cases, soft water is not preferred because of its reactivity with formation clays) is injected to remove sodium hypochlorite which remains in the porous media. 2,000 to 24,000 p.p.m. brine solution is preferably used, e.g. in the method for restoring cores, to maintain the porous media core in approximate reservoir conditions. Preferably from about ½ to about 3 pore volumes of brine is injected, with approximately 2 pore volumes being the most preferred amount.

If the polymer solution has been used as a mobility control agent for displacing various miscible and miscible-type flooding fluids, there may be considerable amounts of residual oil left, e.g. in a truly miscible flood up to about 40% residual oil (based on the oil remaining after an initial waterfloor) can remain after the bank of polymer solution has been injected through the porous media. To remove the remaining oil from the porous media, an oil-soluble solvent is injected. The solvent is preferably a halo-hydrocarbon having at least one halo substituent and having less than 6 carbon atoms per molecule, and more preferably less than three carbon atoms per molecule, examples include: carbon tetrachloride, ethylene dichloride, 1,1,1-trichloroethane, 1,4-dichlorobutane, and the like. Chlorothene Nu (corrosion inhibited 1,1,1-trichloroethane, manufactured under that trade name by the Dow Chemical Company) is especially preferred. It is preferred to inject from about 0.1 to about 3 and more preferably from about 1.5 to about 2.5 pore volumes of the oil-soluble halohydrocarbon solvent into the porous media.

Both preceding and following injection of the oil soluble solvent a buffer solvent is injected which is both oil and water soluble. Examples of such solvents utilized in this invention are the lower aliphatic alcohols having from 1 to about 8 and more preferably from 1 to about 4 carbon atoms per molecule, exemplified by methanol, ethanol, isopropyl alcohol, and the like. Isopropyl alcohol is the most preferred for economic reasons. Other oil and water soluble solvents such as ketones, e.g. acetone, may also be used. The solvent must be soluble both with the brine and oil-soluble halohydrocarbon solvent. The alcohol solution is preferably uncontaminated, although dilution with water or other inert substances may be accomplished. Preferably from about 0.1 to about 3 and more preferably from about 1.5 to about 2.5 pore volumes of the buffer solvents are injected into the porous media.

The final step of the process involves flushing the buffer solvent with brine, water, or brackish water (the same as defined in an earlier previous step.) It is preferred to flush with from about 0.5 to about 5 pore volumes and more preferably from about 3 to about 4 pore volumes of brine.

Consolidated sand cores, e.g. Berea cores, may be washed by the process of this invention numerous times. One important effect of washing the cores, that is, reduction of pressure differential across the core for any given fluid injection rate, is not impaired by successive floodings and washings of the cores. Each washing substantially restores the core to its original condition prior to being subjected to its first flooding test.

The cleaning process of this invention may be equally applied to subterranean oil-bearing reservoirs which have been subjected to a polymer treatment.

The following example is an illustration of a preferred embodiment of this invention, but is not meant to limit it in any way. Rather, modifications and variations obvious to those skilled in the art are intended to be included within the scope of the invention as defined in the specification and appended claims.

EXAMPLE 1

A 44 inch long by 3 inch diameter Berea core is saturated with brine and flooded with Henry crude oil (from the Henry reservoir of Crawford County, Ill.). The saturated core is then waterflooded with Henry field water. The pore volume of the core is determined to be 1,078 cc.

A slug containing 9.0 g. ammonium petroleum sulfonate (molecular weight about 440, 81% active), 47.8 ml. of kerosene, 41.2 ml. of tap water, and 1.4 ml. of normal amyl alcohol is injected into the core. This slug is followed by 1,100 cc. solution containing 1,200 p.p.m. of Dow Series No. 530 Pusher (a high molecular weight partially hydrolyzed polyacrylamide marketed by Dow Chemical Company), 1,200 p.p.m. isopropyl alcohol, 50 p.p.m. ammonium thiocyanate (bactericide) and water from the Palestine Reservoir in Crawford County, Ill. 2.78 pore volumes of 18,000 p.p.m. brine is injected into the core until a final pressure of 100 p.s.i.g. and flow rate of 2,240 cc./hr. is obtained. Following this brine flush 1.85 pore volumes of an aqueous solution containing 5% sodium hypochlorite is injected at a flow rate of 3,000 cc./hr. until the final pressure of 60 p.s.i.g. is obtained. Another 1.85 pore volume slug of 18,000 p.p.m brine is injected into the core to flush the sodium hypochlorite. The final injection pressure is 54 p.s.i.g. for a 2,240 cc./hr. flow rate. 1.85 pore volumes of IPA follows the brine flush at a flow rate of 3,000 cc./hr. until a pressure of 155 p.s.i.g. is obtained. Next is injected 1.85 pore volumes Chlorothene Nu at a flow rate of 3,000 cc./hr. with a final pressure of 48 p.s.i.g. The Chlorothene Nu is removed by injecting a 1.48 pore volume slug of IPA at a flow rate of 3,240 cc./hr. until a final pressure of 160 p.s.i.g. is obtained. Finally, the IPA is flushed and the permeability of the core restored by injecting a 4.64 pore volume slug of 18,000 p.p.m. brine at a flow rate of 2,240 cc./hr. until a final injection pressure of 50 p.s.i.g. is obtained.

The permeability of the core following the polymer flood and preceding the sodium hypochlorite treatment is 260 millidarcies After the treating process is completed, and the final brine flush effected, the permeability has risen to twice the original permeability (520 millidarcies). This substantial increase is permeability demonstrates the cleaning effectiveness of this process. This same core is used for additional similar tests and each time is cleaned by the method disclosed herein. After the sixth cleaning, the cleaned core has a permeability of 489 millidarcies, only a 6% loss in permeability.

What is claimed is:

1. A process for restoring the relative permeability to the flow of water through a porous media wherein the porous media has become "plugged" with a polymer solution, the process comprising:
    (1) contacting the porous media with an aqueous solution having a pH greater than about 8 and containing a compound or mixture of compounds of the formula MOX where M is an alkali metal or ammonium, and X is halogen,
    (2) injecting an aqueous solution to remove the MOX compound,
    (3) removing the aqueous solution of (2) by injecting a buffer solvent which is both oil and water soluble,
    (4) injecting a halogen substituted oil-soluble hydrocarbon solvent,
    (5) injecting a buffer solvent which is both water soluble and oil soluble to remove the oil-soluble solvent, and
    (6) removing the buffer solvent of (5) with an aqueous solution.

2. The process of claim 1 wherein the solution having a pH greater than 8 is comprised of an alkali metal or ammonium hypochlorite.

3. The process of claim 1 wherein the formula MOX is sodium hypochlorite.

4. The process of claim 1 wherein injection of the solution having a pH greater than 8 is followed by injecting an aqueous solution having an ionization constant greater than about $10^{-5}$.

5. The process of claim 4 wherein the aqueous solution has an ionization constant greater than about $10^{-2}$.

6. The process of claim 1 wherein the aqueous solution utilized in (2) is comprised of brine.

7. The process of claim 1 wherein the buffer solvents of (2) and (5) are a lower aliphatic alcohol.

8. The process of claim 7 wherein the buffer solvent is isopropyl alcohol.

9. The process of claim 1 wherein the halogen substituted oil-soluble hydrocarbon solvent comprises a compound selected from the group consisting of carbon tetrachloride, ethylene dichloride, 1,1,1-trichloroethane, and mixtures thereof.

10. A process for restoring the relative permeability to the flow of water through a porous media wherein the porous media has become "plugged" with a polymer solution, the process comprising:
    (1) contacting the porous media with an aqueous solution comprised of from about 0.25 to about 10 weight percent sodium hypochlorite,
    (2) injecting brine to remove the sodium hypochlorite,
    (3) injecting isopropyl alcohol to remove the brine,
    (4) injecting 1,1,1-trichloroethane to remove substantially the hydrocarbon and alcohol in the porous media,
    (5) injecting isopropyl alcohol to remove the 1,1,1-trichloroethane, and
    (6) injecting brine to remove the isopropyl alcohol.

11. The process of claim 10 wherein the polymer comprises partially hydrolyzed, high molecular weight polyacrylamides.

12. The process of claim 1 wherein the polymer comprises partially hydrolyzed, high molecular weight polyacrylamides.

References Cited

UNITED STATES PATENTS

| | | | |
|---|---|---|---|
| 3,122,503 | 2/1964 | Katzer | 166—312 X |
| 3,249,536 | 5/1966 | Jones | 166—300 |
| 3,348,612 | 10/1967 | Messenger | 166—312 X |
| 3,372,748 | 3/1968 | Cook | 166—246 |
| 3,482,635 | 12/1969 | Pasini | 166—305 |
| 3,482,636 | 12/1969 | Crowe | 166—307 |

OTHER REFERENCES

American Petroleum Institute, Secondary Recovery of Oil in the United States, New York, A.P.I., 2nd ed., 1950, pp. 363–364.

STEPHEN J. NOVOSAD, Primary Examiner